United States Patent
Gosline et al.

(10) Patent No.: US 8,624,714 B2
(45) Date of Patent: Jan. 7, 2014

(54) VIRTUAL SIMULATOR HAVING AN EDDY CURRENT BRAKE FOR PROVIDING HAPTIC FEEDBACK

(75) Inventors: Andrew Gosline, Montreal (CA); Juan Manuel Cruz Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 201 days.

(21) Appl. No.: 13/326,030

(22) Filed: Dec. 14, 2011

(65) Prior Publication Data

US 2013/0154813 A1 Jun. 20, 2013

(51) Int. Cl.
*G08B 6/00* (2006.01)

(52) U.S. Cl.
USPC .................................. 340/407.2; 340/407.1

(58) Field of Classification Search
USPC ............. 340/407.2, 407.1; 345/156–163, 184
See application file for complete search history.

(56) References Cited

U.S. PATENT DOCUMENTS

| | | | |
|---|---|---|---|
| 6,184,868 B1 * | 2/2001 | Shahoian et al. | 345/161 |
| 6,211,848 B1 * | 4/2001 | Plesniak et al. | 345/156 |
| 6,470,302 B1 | 10/2002 | Cunningham et al. | |
| 7,113,166 B1 | 9/2006 | Rosenberg et al. | |
| 7,404,716 B2 | 7/2008 | Gregorio et al. | |
| 7,499,021 B2 * | 3/2009 | Bailey | 345/156 |
| 2006/0190823 A1 | 8/2006 | Cunningham et al. | |
| 2006/0209037 A1 | 9/2006 | Wang et al. | |
| 2010/0032255 A1 | 2/2010 | Conti et al. | |

OTHER PUBLICATIONS

Campion, et al., "Initial Results Using Eddy Current Brakes as Fast Turn-On, Programmable Physical Dampers for Haptic Rendering", 2006 Symposium on Haptic Interface for Virtual Environment and Teleoperator Systems IEEE, Mar. 25-26, 2006, pp. 73-74.
Campion, et al., "Passive Viscous Haptic Textures", Proc. 16th Symposium for Virtual Environment and Teleoperator Systems, Mar. 13-14, 2008.
Gosline, et al., "Eddy Current Brakes for Haptic Interfaces", IEEE/ASME Transactions on Mechatronics, vol. 13, No. 6, 2008, 669-677.

* cited by examiner

Primary Examiner — Toan N Pham
(74) Attorney, Agent, or Firm — Medler Ferro PLLC (57) ABSTRACT

A virtual simulator includes a movable user object, an eddy current brake actuator, and a controller. The eddy current brake actuator includes an elongated conductor that is slidingly positioned within at least one magnet. The elongated conductor is coupled to the user object and movement of the user object causes the conductor to move through the at least one magnet which imparts a transient drag force on the conductor. The controller is electrically coupled to the user interface and to the at least one magnet. The controller monitors the velocity of the user object and controls a magnetic field of the at least one magnet to vary the drag force on the conductor in order to provide haptic feedback to a user that relates to force applied to the user object. The virtual simulator may include a display and be configured to perform a medical simulation procedure.

20 Claims, 5 Drawing Sheets

VIRTUAL SIMULATOR HAVING AN EDDY CURRENT BRAKE FOR PROVIDING HAPTIC FEEDBACK

FIELD OF THE INVENTION

The invention relates to virtual simulation systems, and more particularly to a virtual simulation system having an eddy current brake actuator for providing haptic feedback to a user.

BACKGROUND OF THE INVENTION

Virtual reality computer systems provide users with the illusion that they are part of a "virtual" environment and may be used for training and/or entertainment purposes. In many fields, virtual reality systems have been used successfully to allow a user to learn from and experience a realistic virtual environment. The appeal of using virtual reality computer systems for training relates, in part, to the ability of such systems to allow trainees the luxury of confidently operating in a highly realistic environment and making mistakes without real world consequences. For example, in the medical field, a virtual reality computer system allows a doctor-trainee or other human operator or user to manipulate an intravascular or laparoscopic tool within a computer-simulated body and thereby perform medical procedures on a virtual patient. In this instance, a user device such as a computer mouse or joystick is used to represent a surgical instrument. As the surgical instrument moves within a provided space or structure, results of such movement are updated and displayed in a body image displayed on the screen of the computer system so that the operator gains the experience of performing such a procedure without practicing on an actual human being or a cadaver. In other applications, virtual reality computer systems allow a user to handle and manipulate the controls of complicated and expensive vehicles, equipment, and other machinery.

For virtual reality systems to provide a realistic and therefore effective experience for the user, sensory feedback and manual interaction should be as natural as possible. In addition to sensing and tracking a user's manual activity and feeding such information to a controller or computer to provide a 3D visual representation to the user, a human interface mechanism should also provide tactile and/or kinesthetic feedback, more generally known as haptic feedback herein. The need for the user to obtain realistic haptic feedback is extensive in many kinds of simulations and other applications. For example, in medical/surgical simulations, the "feel" of a surgical tool is important as it is moved within the simulated body. It is invaluable to a medical trainee to learn how an instrument moves within a body, how much force is required depending on the operation performed, the space available in a body to manipulate an instrument, etc.

Many types of actuators for generating computer-controlled forces are known, including DC and stepper motors, voice coils, hydraulic actuators, and pneumatic actuators. Some devices are active, such as motors, which mean that the device provides an active force that has the ability to move an object or push back on the user. Other actuators are passive, such as brakes, which provide a resistance to motion generated by another source such as the user and cannot generate forces on their own. An advantage of active devices is their ability to simulate all kinds of force sensations. However, active actuators may be unstable and may settle into a feedback loop in which oscillating forces are output on the manipulandum, for example. Dampers may be utilized with an active actuator in order to stabilize the system, such as those described in "Initial results using Eddy Current Brakes as Fast Turn-on, Programmable Physical Dampers for Haptic Rendering" by Gianni Campion, Andrew Gosline, and Vincent Hayward, and "Eddy Current Brakes for Haptic Interfaces: Design, Identification, and Control" by Andrew Gosline and Vincent Hayward, both of which are herein incorporated by reference in their entirety. The above-mentioned articles describe the use of an eddy current brake as a linear, fast actuating, programmable viscous damper in order to stabilize a motor, which is utilized as the active actuator for haptic rendering. Other disadvantages of active actuators include a high cost, and large size and weight. Passive actuators, on the other hand, while not able to output all the types of force sensations of active actuators, can provide relatively high magnitude forces, are inherently stable and safe, and are typically of low cost and weight. However, standard passive actuators can still be expensive for lower-cost devices and can still add significant weight to an interface device. In addition, a passive actuator may be limited in its ability to simulate different types of force sensations. For example, the article "Passive Viscous Haptic Textures. Proc. 16th Symposium on Haptic Interfaces For Virtual Environment And Teleoperator Systems" by Gianni Campion, Andrew Gosline, and Vincent Hayward, herein incorporated by reference in its entirety, discusses the use of an eddy current brake to generate a viscous texture on a haptic interface. The eddy current brake is not utilized to simulate other force sensations such as vibrations, pulses, jolts, and the like.

With demand for haptic interfaces in areas such as medical training, manufacturing, and perception research, there is a demand for improved and/or alternative actuators for providing haptic effects.

BRIEF SUMMARY OF THE INVENTION

The invention is a virtual simulator comprising a movable user object, an eddy current brake actuator, and a controller. The eddy current brake actuator includes an elongated conductor that is slidingly positioned within at least one magnet. The elongated conductor is coupled to the user object and movement of the user object causes the conductor to move through the at least one magnet which imparts a transient drag force on the conductor. The controller is electrically coupled to the user interface and to the at least one magnet. The controller monitors the velocity of the user object and controls a magnetic field of the at least one magnet to vary the drag force on the conductor in order to provide haptic feedback to a user.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. Actuators known in the art for providing haptic effects, such as motors and braking devices, typically involve contact between moving surfaces, or with particles in suspension, and can be slow to actuate and when they rely on particle magnetization, may suffer from demagnetization hysteresis. Moreover, all contact-based actuated brakes, including friction brakes, particle brakes, magnetorheological (MR) brakes, electrorheological (ER) brakes, exhibit nonlinear and often multi-valued relationships between velocity and braking torque due to the nature of the physics used to create dissipation.

Embodiments hereof relate to an eddy current brake as an actuator for providing haptic feedback to a user device. An eddy current brake is a relatively simple magnetic device that consists of a conductor moving through a magnetic field. As a result of the motion, eddy or Foucault currents are induced to create a resistive force or drag on the conductor that is proportional to the relative velocity, according Lorentz' Force Law. When the conductor moves, eddy currents are induced and a resistive force is generated due to dissipation induced by the Joule Effect. At low speeds, when the effects of the magnetic field induced by the eddy currents can be neglected, the resistive force is proportional to the speed of the conductor. An advantage of using an eddy current brake as an actuator is that it can render friction and transient feedback without any contact between its parts, i.e., the conductor and the magnet. Further, the physics behind eddy current brakes makes them ideal candidates for haptic feedback because they are fast, friction free, and linear in the range of velocities in haptic rendering.

Figure 1:
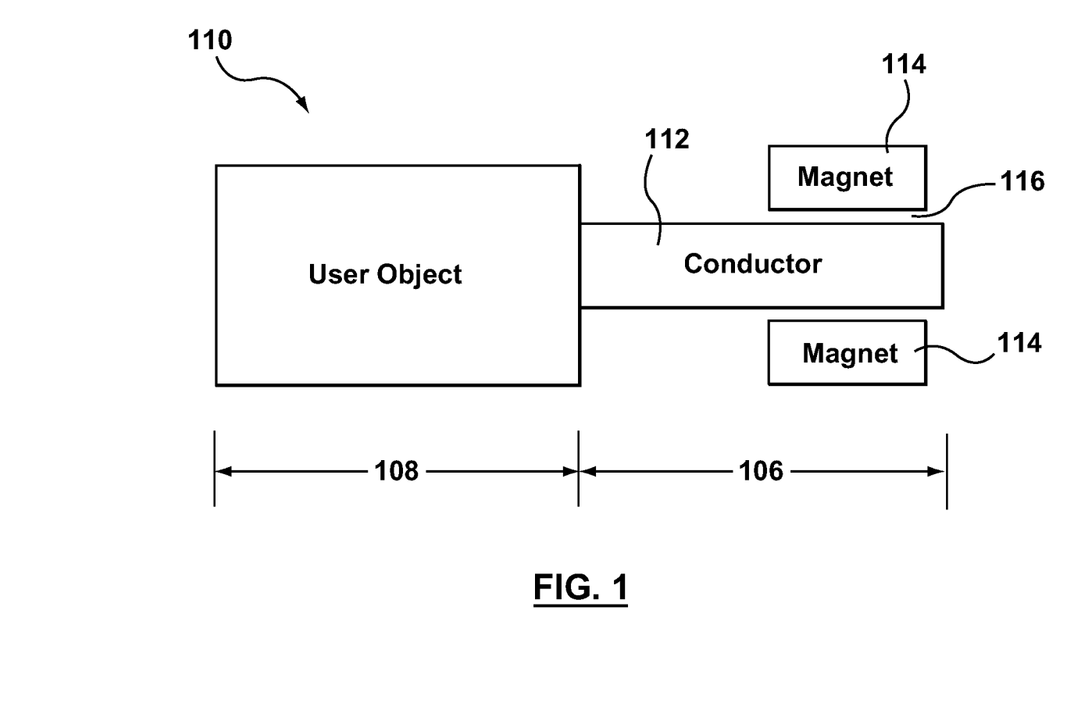
FIG. 1 is a schematic illustration of a haptic interface according to an embodiment hereof, wherein the haptic interface includes an eddy current brake actuator for providing haptic effects to a user object or device.

Referring to the schematic illustration on FIG. 1, a haptic interface 110 having an eddy current brake actuator 106 for providing haptic effects to a user object or device 108 is shown. As will be explained in more detail below with respect to FIG. 2, user object 108 is a manipulatable interface device such as a mouse, a joystick, a stylus, a knob or the like that provides input signals to a host computer (not shown in FIG. 1). User object 108 is physically contacted by the user and moveable in at least one degree of freedom. Eddy current brake actuator 106 includes a conductor 112 and at least one magnet 114 that defines a central passageway 116. Conductor 112 is coupled to user object 108 such that when a user manipulates user object 108, conductor 112 moves within passageway 116 of magnet 114 and a magnetic field created by magnet 114 imparts a resistive force or drag on conductor 112. To impart a resistive drag force on conductor 112, relative motion between user object 108 and eddy current brake 106 is required. Typically, magnet 114 of haptic interface 110 is stationary or fixed and user object 108 is movable relative to magnet 114 although other configurations are possible.

The resistive force or drag on conductor 112 is communicated to the user contacting user device 108 as a haptic effect, i.e., the user feels a resistive force acting against the user object 108 preventing or retarding movement thereof in one or more degrees of freedom. To vary the amount of resistive force or drag on user object 108 and thereby produce transient haptic effects, the magnetic field produced by magnet 114 is varied. The magnetic field may be varied several different ways, depending upon whether magnet 114 is an electromagnetic magnet or a permanent magnet, or some combination of both. In one embodiment, magnet 114 is at least one electromagnetic magnet and the magnetic field within passageway 116 is varied by controlling the supplied current. When the magnetic field oscillates, forces are induced in conductor 112 at the oscillation frequency. The applied magnetic field has a magnitude and a frequency, and the magnetic field may be applied in various signal configurations such as but not limited to a sine wave, square wave, a saw-toothed-up wave, a saw-toothed-down wave, and a triangle wave. The frequency and/or the magnitude of the magnetic field may be varied. Varying the magnitude of the magnetic field will affect the strength of the signal felt by the user, while varying the frequency will affect the speed, or time dependence of the signal. In one embodiment, the frequency may be varied between 10 Hz to 400 Hz. With an electromagnetic magnet, the magnet field may be completely turned off, i.e., resulting in a magnetic field of 0 Tesla having no haptic effects, and may range up to approximately 1.5 Tesla which is the maximum achievable magnetic field with an iron core in a cost effective magnetic circuit.

In another embodiment, magnet 114 includes a plurality of magnets that are a combination of at least one permanent magnet and at least one electromagnetic magnet. The magnetic field within passageway 116 is varied by controlling the magnitude and/or frequency of the supplied current to the at least one electromagnetic magnet as described above. When utilized in combination with at least one permanent magnet, the magnetic field cannot be completely turned off due to the permanent magnet but the magnitude and/or period of the magnetic field may be varied due to the at least one electromagnetic magnet.

Figure 5:
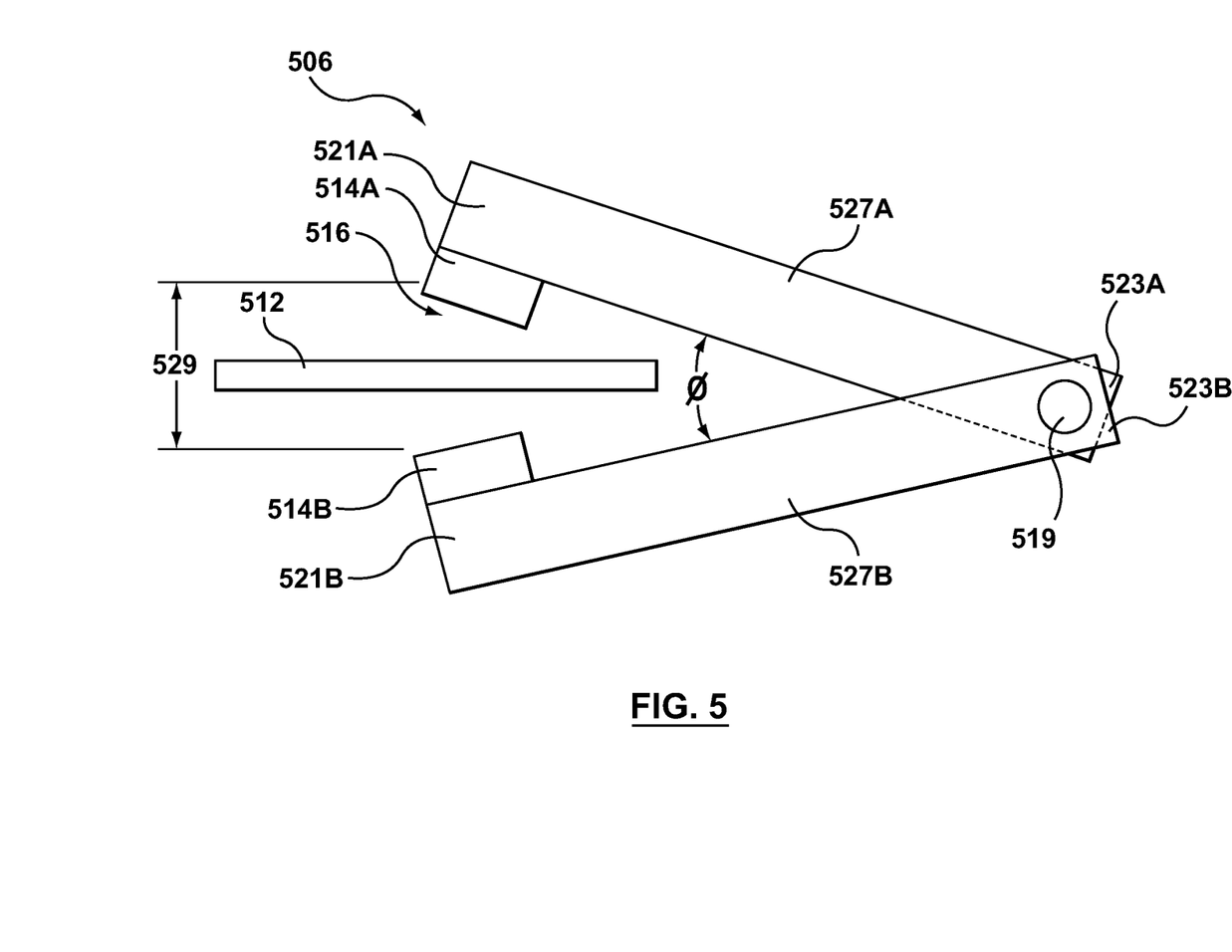
FIG. 5 is a schematic diagram of an eddy current brake actuator according to another embodiment hereof.

In another embodiment hereof, the actuator includes a plurality of permanent magnets and the magnetic field within the passageway is varied by controlling the distance or space between the permanent magnets. More particularly, with reference to the schematic shown in FIG. 5, an eddy current brake actuator 506 includes a conductor 512 and two permanent magnets 514A, 514B that define a central passageway 516. Similar to eddy current brake actuator 106, conductor 512 moves within passageway 516 of magnets 514A, 514B and a magnetic field created by magnets 514A, 514B imparts a resistive force or drag on conductor 512. To vary the amount of resistive force or drag on conductor 512, the magnetic field produced by magnets 514A, 514B may be varied by changing the amount of air space or gap 529 between the permanent magnets. Magnets 514A, 514B are coupled to a first end 521A, 521B of arms 527A, 527B, respectively, and the first ends are spaced apart from each other to form gap 529. In one embodiment, arms 527A, 527B are iron bars. Second ends 523A, 523B of arms 527A, 527B are coupled together via a hinge or revolving joint 519. Hinge 519 is electrically coupled to the controller (not shown in FIG. 5) of the haptic interface, and the controller actuates joint 519 to enlarge or reduce angle Ø between arms 527A, 527B. In other words, the controller causes second ends 523A, 523B of arms 527A, 527B to move towards or away from each other, thereby effectively varying the length of gap 529 between the two permanent magnets 514A, 514B.

Figure 4:
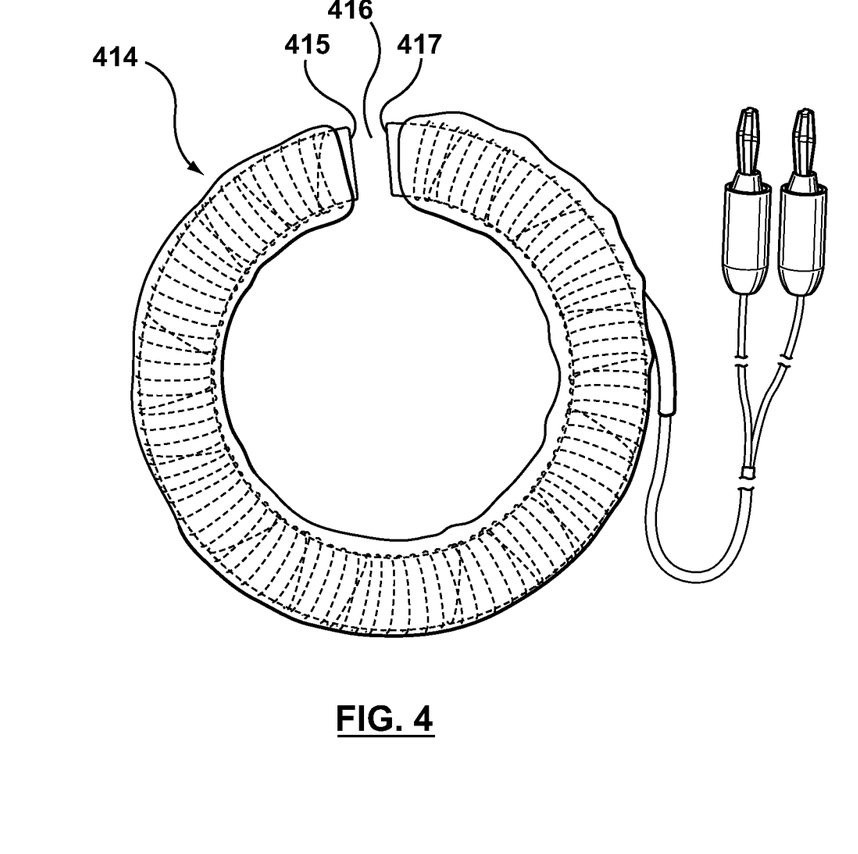
FIG. 4 is an exemplary electromagnetic magnet for use in embodiments hereof.

The magnet may be one or more magnets having any suitable geometry or configuration that creates a magnetic field within passageway or opening that is sized to receive conductor 112. In one embodiment shown in FIG. 4, magnet 414 is a coiled or toroid configuration. Magnet 414 includes a solid iron core and an enamel coated magnet wire wrapped around the core. The conductor is introduced into passageway 416, which is formed between a first end 415 of magnet 416 and a second end 417 of magnet 415. Magnet 414 may be constructed by machining a toroid from a solid iron ingot on a lathe. A thin slot is cut in the toroid to form passageway 416, and then an enamel coated magnet wire is wrapped around the coil.

Conductor 112 is formed from a conductive material. In one embodiment, conductor 112 is formed from aluminum which is conductive and has a light density. However, other conductive materials are possible such as but not limited to gold, silver, copper, or magnesium. In one embodiment, conductor 112 is an elongated tubular object or shaft. Conductor 112 may have any suitable cross-section including circular, square, rectangular, or any polygonal cross-section. In one embodiment, conductor 112 is solid rather than hollow for increased conductivity.

Figure 2:
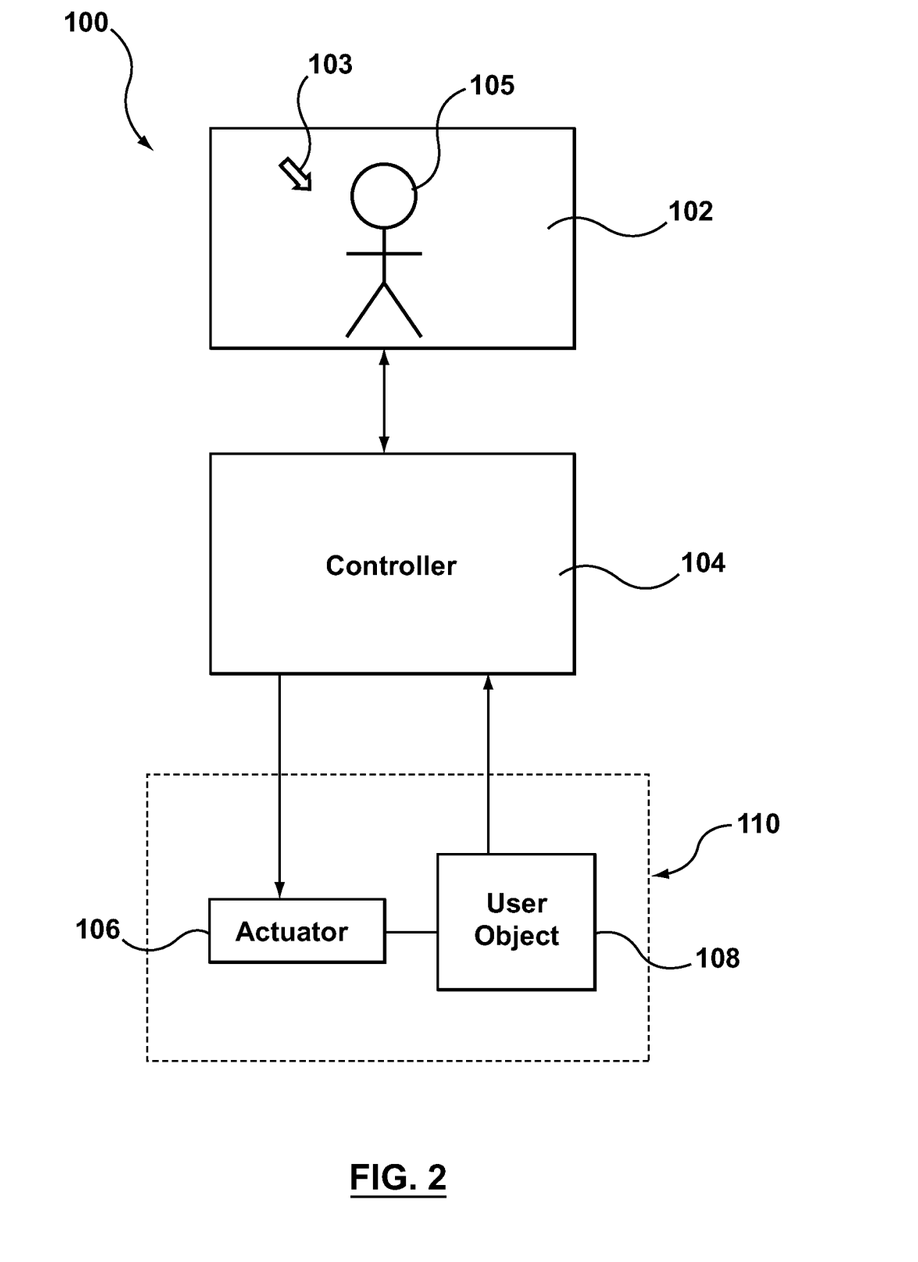
FIG. 2 is a schematic block diagram of a virtual simulator system that utilizes the haptic interface of FIG. 1.

Referring now to FIG. 2, a schematic block diagram of haptic interface 110 utilized within a virtual simulator system 100 according to an embodiment hereof is shown. Virtual simulator system 100 includes a display 102, a controller 104, and haptic interface 110 which includes eddy current brake actuator 106 and user object 108 as described above. Display 102 may be a standard display screen or any other visual interface that provides a graphical environment to a user. As understood by those of ordinary skill in the art of virtual simulator systems, a user interacts with the graphical environment of display 102 by manipulation of the user object 108 and by receiving visual, audible, and/or haptic feedback of the interaction. Within the graphical environment is a cursor 103, such as the arrow cursor shown in FIG. 2. By cursor it is meant any cursor or object, the position, movement, shape, or the like of which is controllable. Also within the graphical environment is a graphical representation 105 such as a graphical representation of at least a portion of a living body. For example, the graphical representation 105 may comprise a human body, a portion of a human body, an animal body, or a portion of an animal body.

Controller 104 may include logic resources, such as a general-purpose or specific-purpose processing device or microcontroller, and may further include other specific sensor-dependent components required to analyze and store data/measurements from user object 108. In one embodiment, controller 104 may be associated with a memory device (not shown) for storing data and/or instructions. The memory device can be any type of storage device or computer-readable medium, such as random access memory ("RAM") or read-only memory ("ROM"). The memory device stores logical instructions, commands, and/or code executed by controller 104. In another embodiment, logical instructions, commands, and/or code can be implemented in hardware and incorporated in controller 104 using discrete logic circuitry, an application specific integrated circuit ("ASIC"), a programmable gate array ("PGA"), a field programmable gate array ("FPGA"), etc., or any combination thereof. In yet another embodiment, logical instructions, commands, and/or code can be implemented in both hardware in controller 104 and software/firmware stored in the memory. Controller 104 is typically implemented by a conventional or commercially available workstation, such as those manufactured by IBM, Dell or Silicon Graphics, Inc.

Controller 104 is electrically coupled to display 102 via a transmission medium (not shown), and is also electrically or optically coupled to user object 108 to receive position or movement information therefrom. Signals may be sent between controller 104 and display 102, and between controller 104 and user object 108, by a standard wired interface such as RS-232, USB, Firewire, serial, parallel, etc. or by wireless transmission and reception. Controller 104 is capable of generating and/or controlling the graphical environment of display 102 according to the position or movement information received from user object 108. More particularly, user object 108 is manipulatable by a user and the manipulation of user object 108 controls the position of cursor 103 within graphical environment 105, for example by directly correlating a position of user object 108 with a displayed position of cursor 103 or by correlating a position of user object 108 with a rate of movement of cursor 103. For example, when user object 108 is moved by the user, a graphical representation of the tool or a part of the tool may be moved correspondingly within a graphical environment displayed on display 102. Accordingly, a user interacts with user object 108 while observing the effects of the interaction on display 102.

In addition to controlling the graphical environment of display 102 during operation of virtual simulator system 100, controller 104 directly controls the forces output by eddy current brake actuator 106. In a closed-loop manner, controller 104 causes eddy current crake actuator 106 to output haptic feedback to the user in response to a predetermined interaction between the cursor 103 and the graphical representation 105. For example, when user object 108 is manipulated so as to cause the cursor 103 to be positioned on or in contact with the graphical representation 105, a haptic effect is provided by eddy current brake actuator 106 to the user object 108 in accordance with program code within or in communication with controller 104. By haptic effect it is meant any sensation provided to the user that is related to the user's sense of touch. Herein, the term "haptic effect" or "tactile sensation" may refer to either a single force or a sequence of forces output by eddy current brake actuator 106 which provides a transient resistive force to the user. For example, vibrations, a single jolt or pulse, or a texture sensation are all considered haptic sensations. The haptic effect may be kinesthetic force feedback and/or tactile feedback. By kinesthetic force feedback it is meant any active or passive force applied to the user to simulate a force that would be experienced in the graphical environment of display 102, such as a resistive force applied to the user object 108 to simulate a force acting on at least a portion of the cursor 103. For example, if the cursor 103 is positioned against a surface, a barrier, or an obstruction, eddy current brake actuator 106 may output a force against user object 108 preventing or retarding movement of the user object 130 in the direction of the surface, barrier or, obstruction. By tactile feedback it is meant any active or passive force applied to the user to provide the user with a tactile indication of a predetermined occurrence within the graphical environment of display 102. For example, a vibration, click, pop, or the like may be output to the user when the cursor 102 interacts with a graphical object. Additionally, tactile feedback may comprise a tactile sensation applied to approximate or give the illusion of a kinesthetic force. For example, by varying the frequency and/or the amount of an applied resistive force, variations in surface textures of different graphical objects can be simulated, or by providing a series of clicks when a cursor penetrates an object, resistance to the penetration can be simulated. In one exemplary version, a kinesthetic force sensation, such as a spring force, may be applied to the user whenever cursor 103 engages graphical representation 105 to simulate a selectively deformable surface. Alternatively or additionally, a tactile sensation, such as a pop, may be applied to the user when cursor 103 is moved across a surface of graphical representation 105 to simulate a texture of graphical representation 105.

Figure 3:
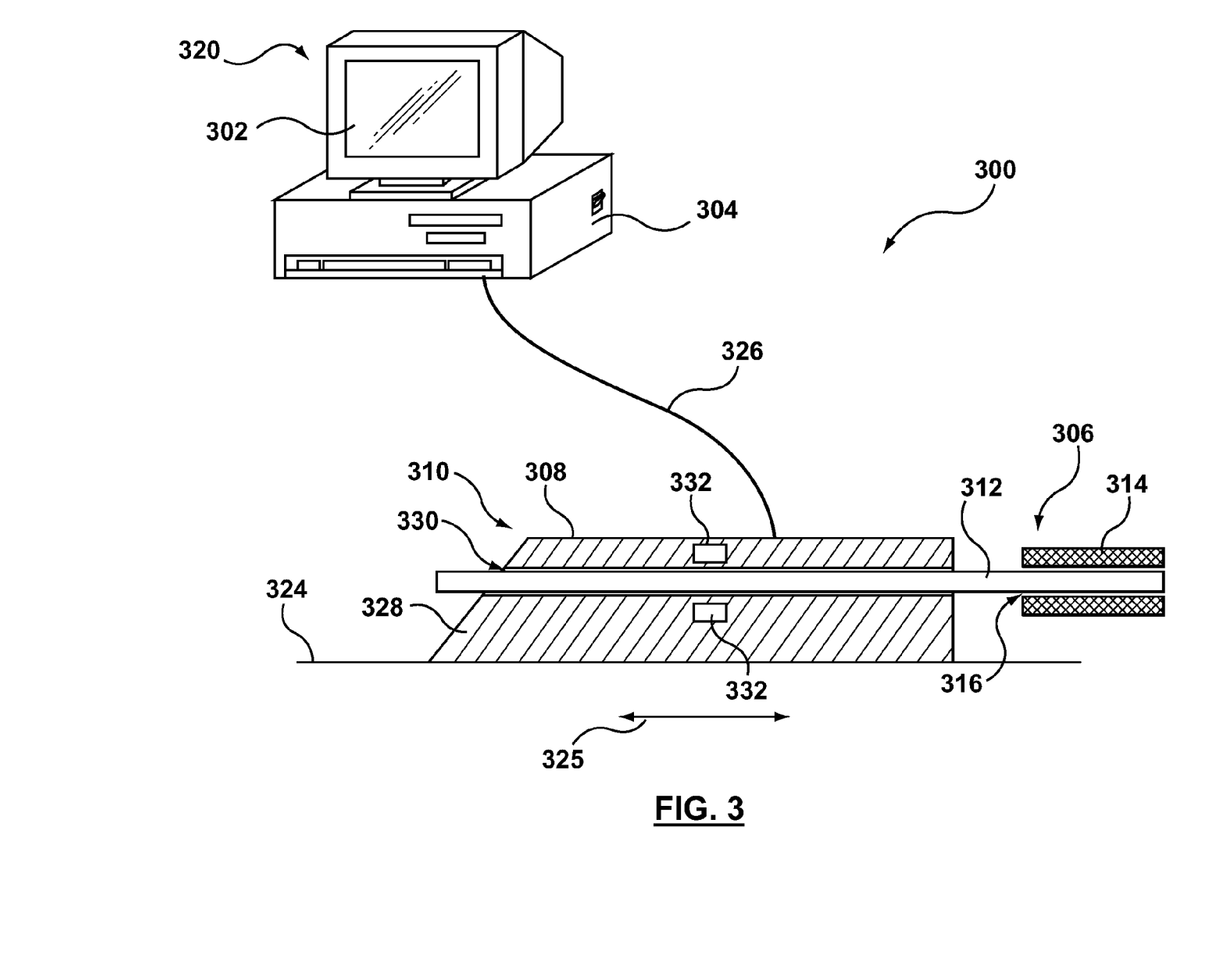
FIG. 3 is a schematic illustrations of a virtual simulator system according to an embodiment hereof.

In one embodiment described in more detail herein with respect to FIG. 3, the feedback provided by eddy current brake actuator 106 is related to the user applied force to user object 108. Controller 104 monitors the velocity/speed of user object 104 via one or more sensors and then varies the magnetic field of eddy current brake actuator 106 in order to vary the resistive force or drag imposed on conductor 112, thereby providing transient haptic effects to user object 108 which are feedback related to the amount of force applied to the user object 108. Controller 104 receives the position or movement information from user object 108 and accordingly processes or analyzes the data/measurements as necessary in order to control the magnetic field of eddy current brake actuator 106. Controlling the magnetic field of the eddy current brake actuator by either varying the current supplied to an electromagnetic magnet or by varying the amount of air space between at least two permanent magnets provides haptic feedback information to an operator.

In one embodiment, controller 104 includes a host medical simulation application program and virtual simulation system 100 performs a medical simulation. Suitable software for such applications is available from Immersion corporation of San Jose, Calif. For example, virtual simulation system 100 may be a catheter or trocar insertion simulation system and controller 104 may determine the effects on a simulated human anatomy based on the user applied force to user object 108. Anatomical models are deformed or otherwise adjusted to reflect catheter or trocar motion with simulated results displayed by controller 104 on display 102. In addition, resistive or reactive forces encountered by a medical professional during an actual procedure are imparted to user object 108 via eddy current brake actuator 106 as described herein to enable the simulation to have a realistic feel. Medical virtual simulation systems may include additional components not shown in FIG. 2, such as but not limited to a barrier (not shown) used to represent a portion of the skin covering the body of a patient. Virtual simulation system 100 may be other medical simulation systems, including but not limited to a vascular access training system which trains medical professionals to access veins in hospital and/or clinical settings for introduction of fluids into and sampling blood from the accessed veins. Basically, a vascular access training system may be utilized to train medical professionals to perform various techniques, such as peripheral vascular access, intravenous catheterization, peripherally inserted central catheter placement and central venous catheterization.

One example of a medical simulation system is shown in the schematic illustration of FIG. 3. Medical simulation system 300 includes a computer 320 which includes a display 302 and a controller 304. Computer 320 is electrically coupled via at least one lead 326 to a haptic interface device 310 for supplying current to the magnet of the eddy current brake actuator. Lead 326 includes at least two wires or channels, one for transferring sensor information from the user object to the computer and one for transferring actuation information from the computer to the eddy current actuator. The wires do not have to be the same size. For example, a thinner wire may be utilized for transferring the sensor information since low current is required, while a thicker wire may be utilized for transferring the actuation information since the thicker wire has a higher current carrying capacity. Similar to haptic interface device 110, haptic interface device 310 includes a user object 308 and an eddy current brake actuator 306 for providing haptic effects to the user. Computer 320/ controller 304 directly controls and processes all signals to and from haptic interface device 310, i.e., computer 320 directly receives sensor signals from user object 308 and directly controls the forces output by eddy current brake actuator 306.

User object 308 is a mouse-like device having a housing 328 that is preferably grasped or gripped and manipulated by a user. By "grasp," it is meant that users may releasably engage a portion of the object in some fashion, such as by hand, with their fingertips, etc. Mouse-like user object 308 rests on a ground surface 324 such as a tabletop, mousepad, or a platform. A user grasps mouse-like user object 308 and moves mouse-like user object 308 in a planar workspace on the surface 324 as indicated by arrows 325.

Mouse-like user object 308 includes and one or more sensors 332 that sense the position or motion of the mouse, e.g., the housing 328, in its planar degrees of freedom along the X and Y axes and provide signals to controller 304 including information representative of the position or motion. Sensors suitable for detecting planar motion of a tactile mouse include digital optical encoders frictionally coupled to a rotating ball or cylinder, as is well known to those skilled in the art. Optical sensor systems, linear optical encoders, potentiometers, optical sensors, velocity sensors, acceleration sensors, strain gauge, or other types of sensors can also be used, and either relative sensors which detect a change in position or absolute sensors which track the absolute position of mouse-like user object 308 with reference to a particular predefined workspace can be provided. For example, an optical sensor that has no moving mouse ball component may be used, where the optical sensor detects motion of the mouse relative to the planar support surface by optically taking and storing a number of images of the surface and comparing those images over time to determine if the mouse has moved. For example, the IFeel™ mouse device from Logitech Corporation uses this type of sensor. An optional sensor interface (not shown) can be used to convert sensor signals to signals that can be interpreted by controller 304, as is well known to those skilled in the art.

Mouse-like user object 308 is acted on by eddy current brake actuator 306 which is operative to produce transient drag or resistive forces on mouse-like user object 308 and thereby provide haptic effects to the user. Eddy current brake actuator 306 includes an elongated conductor 312 and electromagnetic magnet 314 that defines a central passageway 316. Conductor 312 is coupled to user object 308 such that when a user manipulates user object 308, conductor 112 moves within passageway 316 of magnet 314 and a magnetic field created by magnet 314 imparts a resistive force or drag on conductor 312 and thereby provides haptic effects to the user. Computer 320, via controller 304, varies the magnetic field created by magnet 314 in order to produce transient haptic effects. As discussed above with respect to controller 104, controller 304 varies the magnetic field by controlling the current supplied to an electromagnetic magnet. Computer 320 provides and varies current supplied to eddy current brake actuator 306 via lead 326.

In one embodiment, user object 308 may be a modified EV Lite™ device manufactured by CAE Healthcare of Montreal, Calif. The EV Lite™ device uses mouse tracking or position sensors to estimate insertion and twist on an elongated rod inserted through a continuous channel or passageway 330 formed through housing 328. When modified for use herein, a conductive rod 312 is inserted through the continuous channel 330 of the EV Lite™ device housing. Rod 312 is formed from a conductive material such as but not limited to aluminum, gold, silver, copper, or magnesium. Sensors 332 measure the velocity/speed of rod 312 as well as the twist applied thereto, and a representation of the sensor signal(s) is provided to computer 320 via lead 326 or other suitable transmission medium such as via an optical connection. Controller 304 uses the sensor signals from user object 308 to control the graphical environment on display 302 as well as to vary the magnetic field created by magnet 314 in order to generate transient haptic effects on user object 308 and provide haptic feedback to the user that relates to the amount of force applied to the user object. Thus images are displayed and/or modified on the display 302 of the computer 320 in response to manipulations of mouse-like user object 308, and at the same time relevant haptic feedback related to the force applied to mouse-like user object 308 is provided to the user. The user experiences the forces generated on mouse-like user object 308 as realistic simulations of force sensations such as clicks or detents, jolts, vibrations, and the like. By measuring and providing feedback relating to insertion speed and twist, medical simulation system 300 is useful for simulating a catheter or trocar insertion procedure.

Embodiments hereof can employ additional actuators for providing additional haptic effects and/or audio or visual feedback effects. In one embodiment, the user object can include multiple eddy current brake actuators for greater magnitude forces, forces in multiple degrees of freedom, and/or different simultaneous haptic effects. In another embodiment, the user object can be enhanced with a secondary, different type of actuator in addition the eddy current brake actuator described herein.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. For example, while embodiments hereof are discussed with reference to a medical simulation system, it will be appreciated that an eddy current brake actuator as described herein may be utilized for rendering haptic effects within other virtual simulation systems. For example, the eddy current brake actuator may be particularly useful in virtual simulation systems simulating screw drivers, pool cues, hand grips, etc. and may be integrated with other user objects including but not limited to joysticks and styluses. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A virtual simulator comprising:
a movable user object;
an eddy current brake actuator including an elongated conductor that is slidingly positioned within at least one magnet, wherein the elongated conductor is coupled to the user object and wherein movement of the user object causes the conductor to move through the at least one magnet which imparts a transient drag force on the conductor; and
a controller coupled to the user object and to the at least one magnet, wherein the controller monitors a velocity of the user object and controls a magnetic field of the at least one magnet to vary the drag force on the conductor in order to provide haptic feedback to a user that relates to force applied to the user object.

2. The virtual simulator of claim 1, wherein the user object includes at least one mouse tracking sensor for measuring velocity of the user object.

3. The virtual simulator of claim 1, wherein the conductor is formed from aluminum.

4. The virtual simulator of claim 1, wherein the conductor is solid.

5. The virtual simulator of claim 4, wherein the conductor has a square cross-section.

6. The virtual simulator of claim 4, wherein the conductor has a circular cross-section.

7. The virtual simulator of claim 1, wherein the at least one magnet includes at least one electromagnetic magnet and wherein the controller controls the magnetic field of the at least one magnet by varying a current supplied to the electromagnetic magnet.

8. The virtual simulator of claim 7, wherein the electromagnetic magnet is a coil.

9. The virtual simulator of claim 1, wherein the at least one magnet includes at least a first permanent magnet and a second permanent magnet that are separated by a distance and wherein the controller controls a magnetic field by changing the distance between the permanent magnets.

10. The virtual simulator of claim 1, wherein the controller is optically connected to user object.

11. The virtual simulator of claim 1, further comprising: a display coupled to the controller.

12. A virtual simulator comprising:
a movable user object having an elongated conductor coupled thereto and a sensor for measuring a velocity of the user object;
at least one magnet defining a passageway for receiving the elongated conductor, wherein movement of the user object causes the conductor to move through the passageway and the at least one magnet imparts a transient drag force on the conductor,
a controller coupled to the user object and to the at least one magnet, wherein the controller receives velocity measurements from the sensor and provides control signals to the at least one magnet that vary the drag force on the conductor in order to provide haptic feedback to a user that relates to force applied to the user object; and
a display coupled to the controller, wherein the controller controls a graphical environment on the display according to position information received from the user object.

13. The virtual simulator of claim 12, wherein the conductor is formed from aluminum.

14. The virtual simulator of claim 12, wherein the conductor is a solid rod.

15. The virtual simulator of claim 14, wherein the conductor has a square cross-section.

16. The virtual simulator of claim 14, wherein the conductor has a circular cross-section.

17. The virtual simulator of claim 12, wherein the at least one magnet includes at least one electromagnetic magnet and wherein the controller controls a magnetic field of the at least one magnet by changing a current supplied to the electromagnetic magnet.

18. The virtual simulator of claim 17, wherein the electromagnetic magnet is a coil.

19. The virtual simulator of claim 12, wherein the at least one magnet includes at least a first permanent magnet and a second permanent magnet that are separated by a distance and wherein the controller controls a magnetic field by changing the distance between the permanent magnets.

20. The virtual simulator of claim 12, wherein the controller is optically connected to the user object.

* * * * *